United States Patent
Liu et al.

(10) Patent No.: US 8,009,585 B2
(45) Date of Patent: Aug. 30, 2011

(54) METHOD AND SYSTEM FOR TOPOLOGY DISCOVERY IN AN SIP NETWORK

(75) Inventors: Jun LJ Liu, Beijing (CN); Wei BJ Lu, Beijing (CN); Ben Bo Yang, Beijing (CN); Chun Ying, Beijing (CN); Qing Bo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 11/326,006

(22) Filed: Jan. 5, 2006

(65) Prior Publication Data

US 2009/0103451 A1   Apr. 23, 2009

(30) Foreign Application Priority Data

Jan. 5, 2005   (CN) .......................... 2005 1 00002120

(51) Int. Cl.
H04L 12/28   (2006.01)
(52) U.S. Cl. .................. 370/254; 370/352; 370/356
(58) Field of Classification Search .................. 370/352, 370/389, 467, 216, 474, 392; 709/244, 206, 709/238, 240, 241, 203, 228, 245
See application file for complete search history.

(56) References Cited

U.S. PATENT DOCUMENTS

| | | | |
|---|---|---|---|
| 5,049,873 A | 9/1991 | Robins et al. | |
| 5,664,107 A | 9/1997 | Chatwani et al. | |
| 5,850,397 A | 12/1998 | Raab et al. | |
| 5,996,513 A | 12/1999 | Nanbu et al. | |
| 6,205,122 B1 | 3/2001 | Sharon et al. | |
| 6,275,856 B1 | 8/2001 | Hirata et al. | |
| 6,483,812 B1 | 11/2002 | Prorock | |
| 6,574,663 B1 | 6/2003 | Bakshi et al. | |
| 6,614,764 B1 | 9/2003 | Rodeheffer et al. | |
| 6,654,802 B1 | 11/2003 | Oliva et al. | |
| 6,681,248 B1 | 1/2004 | Sears et al. | |
| 6,697,338 B1 | 2/2004 | Breitbart et al. | |
| 6,892,230 B1* | 5/2005 | Gu et al. | 709/220 |
| 7,412,521 B2* | 8/2008 | Olson et al. | 709/227 |
| 7,496,188 B2* | 2/2009 | Saha et al. | 379/202.01 |
| 7,542,461 B2* | 6/2009 | Oran | 370/352 |
| 7,706,300 B2* | 4/2010 | Norrgard et al. | 370/254 |
| 7,738,397 B2* | 6/2010 | Clayton | 370/254 |
| 7,764,618 B2* | 7/2010 | Salama et al. | 370/238 |
| 2003/0097438 A1 | 5/2003 | Bearden et al. | |
| 2005/0265327 A1* | 12/2005 | Buch et al. | 370/389 |
| 2006/0002309 A1* | 1/2006 | Ban | 370/254 |
| 2006/0098586 A1* | 5/2006 | Farrell et al. | 370/254 |
| 2007/0036143 A1* | 2/2007 | Alt et al. | 370/352 |
| 2007/0115856 A1* | 5/2007 | Schelen et al. | 370/254 |
| 2007/0162613 A1* | 7/2007 | O'Neill et al. | 709/238 |
| 2009/0110174 A1* | 4/2009 | Gallant et al. | 379/210.02 |

\* cited by examiner

*Primary Examiner* — Michael J Moore, Jr.

(74) *Attorney, Agent, or Firm* — Van Nguy; Ryan, Mason & Lewis, LLP

(57) ABSTRACT

A method for discovering topology in an SIP network is disclosed. According to the method, the SIP network is divided into domains governed by corresponding SIP proxies. A management system creates a topology agent for each SIP-domain and registers it with the governor proxy of each SIP-domain. Each topology agent generates topology-exploring messages to other agent and accumulates topology-exploring messages from other agents, gather routing information of the SIP network based on the collected topology-exploring messages to deduce topology of the SIP network.

17 Claims, 11 Drawing Sheets

METHOD AND SYSTEM FOR TOPOLOGY DISCOVERY IN AN SIP NETWORK

BACKGROUND

1. Technical Field

The present invention generally relates to a method and system for managing communications networks. In particular, the present invention relates to a method and system for discovering topology in a SIP network.

2. Background Art

VoIP (Voice over Internet Protocol) is a group of technologies that are used to provide voice services using Internet protocol in packet networks. Compared with traditional circuit-switch based voice delivery technology, VoIP has a series of advantages including low cost for use and maintenance, flexibility for upgrade and expansion, facility for integration and convergency. Therefore, VoIP becomes an emergent technology in communication world and revolutionizes the telephone networks and services. Session Initiation Protocol (SIP) is the application-layer signaling protocol in VoIP for creating, modifying and terminating communication sessions. SIP's power of simplicity, flexibility and extensibility makes it more and more prevailing in communication area.

A SIP network is a group of SIP-enabled entities connected to communicate with others through communication links. In recent years, lots of SIP networks have been deployed in enterprises and communication carriers' domain to provide VoIP services. With the extension of SIP VoIP network scale, the management challenge is raised to network administrator. To manage SIP network efficiently, administrator needs to know an important aspect of the SIP network—topology, the application-layer layout of the interconnections and routing information among linked SIP entities.

Topology information is very important to network management and network layout. With topology information, the network administrator may manage the network more efficiently, improving the network capability. For example, the warning information can be showed on the topology figure intuitively when a SIP device has failure. And the network administrator can find the location where the failed device locates rapidly, predict the problems that would be brought by the network capability drop caused by the failure, and justify and set with the topology information to avoid such cases occur.

How to obtain the topology information of a network is an important issue in network management. Topology discovery is such a technology to obtain and report network topology information. A simplest topology discovery method is to request the network administrator input the location information of devices and the connecting links between them manually and draw out network topology figure directly. Although this method is simple, it would become boring and low efficient when the number of devices is large, and the quality is difficult to control. Therefore, automatic topology discovery technology is needed to complete this task. The following technologies are related to the area of automatic topology discovery.

U.S. Pat. No. 6,205,122 discloses a system and method for automatic detection of physical network topology, by correlating information from computers connected to the network. This information is gathered through the operation of a plurality of agents, which are distributed throughout the network and which are operated by a computer connected to the network. The agents exchange information in order to at least partially determine the physical topology of the network.

U.S. Pat. No. 6,697,338 discloses a method for determining physical connectivity between elements in a multiple subnet communication network. Address sets are generated for each interface of the network elements, wherein members of a given address set correspond to network elements that can be reached from the corresponding interface for which the given address set was generated. A set of candidate connections between an interface of the given network element and one or more interfaces of other network elements are determined. If more than one candidate connection is determined, connections with network elements that are in the same subnet as the given network element are eliminated from the set.

U.S. Pat. No. 6,681,248 discloses a method to track the connectivity of the network uses the trace messages. In this method, a network manager creates a list of ports in the network and uses that list to track the connectivity. For each port, the manager first checks whether there is a current connection and if it finds one, records the connection. For the unconnected ports, the manager enables the transmission of a trace message that identifies the transmitting port. When a trace detected message is received from a port, the network manager updates the list of ports with the connection just reported and disables the trace message that was detected.

However, those methods focus on physical-layer or network-layer interconnections in specific networks. And they cannot solve the difficult issues raised by SIP networks. SIP protocol is an application-layer signaling protocol. Compared with the physical-layer or network-layer protocol in the above methods, SIP network topology is different in protocol message format, entity detecting method etc. Furthermore, between the entities in SIP network there is logic connection relationship, which is different from the connection on physical-layer or network-layer. The transferring paths of SIP messages between the SIP network entities are not on the same level with physical-layer or network-layer, and could not be represented by the existing routing on physical-layer or network-layer. Therefore, the existing topology discovering methods could not be applied on SIP network. It's desirable to provide a new topology discovering method and system which can be applied on SIP network.

SUMMARY OF THE INVENTION

Therefore, the object of the present invention is to provide a method and system for discovering topology in a SIP network.

According to one aspect of the present invention, a method for discovering topology in a SIP network is provided, the SIP network including a plurality of SIP entities. The method comprising the steps of: determining a plurality of SIP-domain in the SIP network, each SIP-domain including a governor proxy and at least one user agent; generating a topology agent for each SIP-domain and registering the topology agent with the governor proxy of each SIP-domain; generating and collecting topology-exploring messages by the topology agent to gather routing information of the SIP network based on the collected topology-exploring messages; and determining topology of the SIP network based on the routing information.

According to another aspect of the present invention, a system for discovering topology in a SIP network is provided, the SIP network including a plurality of SIP entities. The system comprising: SIP-domain determining means for determining a plurality of SIP-domain in the SIP network, each SIP-domain including a governor proxy and at least one user agent; topology agent controlling means for assigning a topology agent for each SIP-domain and registering the topology agent to each specific SIP-domain; topology agents corresponding to each SIP-domain and registered with the governor agent of each SIP-domain, for generating and collecting topology-exploring messages to gather routing information of the SIP network based on the collected topology-exploring messages; and topology determining means for determining topology of the SIP network based on the routing information.

According to still another aspect of the present invention, a computer readable medium embodying computer executable program code is provided. The program code is used to implement the method of discovering topology in SIP network according to the present invention.

The present invention has the following benefits:
automatically identifying SIP entities in a SIP network;
automatically discovering interconnections among SIP entities;
automatically discovering how SIP-domains are connected to each other.

BRIEF DESCRIPTION OF FIGURES

To understand the present invention generally, the present invention is described in reference with the accompanying figures. In the figures.

DETAILED DESCRIPTION

Before the preferred embodiments of the present invention are illustrated in detail, the terminology used in this specification is described as below:

Terminology

SIP Network and SIP-domain

A SIP network is a group of SIP-enabled entities connected to communicate with others through communication links. There are two types of SIP entities in a SIP network, Proxy and UA (User Agent). Proxy is an intermediary entity that acts as both a server and a client for the purpose of making requests on behalf of other clients. The proxy plays the role of routing and registration. Routing is to deliver a request from the source entity to the targeted entity. Registration is to accept UAs register requests and place the location information specified in the request into a location database for user contact. UA is an endpoint entity, which initiates and terminates communication sessions by exchanging SIP requests and responses. Some UA examples are IP phones, soft phones in computers and telephony gateways. An SIP network can be divided into domains governed by corresponding SIP proxies. We call this kind of domain as a "SIP-domain". Each SIP-domain includes a governor proxy and a group of UAs. Each UA in a SIP-domain is registered with the proxy in this SIP-domain.

Figure 1:
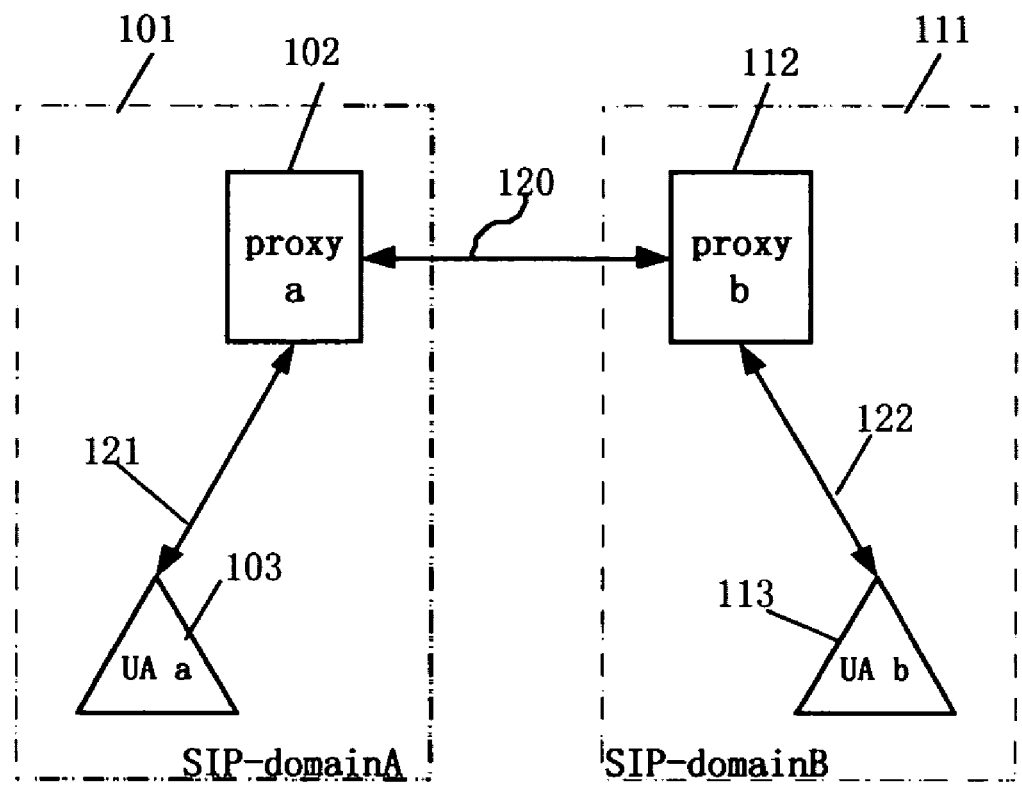
FIG. 1 is a diagram illustrating an example of a SIP network.

FIG. 1 illustrates a sample SIP network. There are two SIP-domains, SIP-domain 101 and SIP-domain 111, in this SIP network. SIP-domain 101 includes a governor proxy 102 and a UA 103 that registers with proxy 102. SIP-domain 111 includes a governor proxy 112 and a UA 113 that registers with proxy 112. Communication links 120-122 connect these SIP entities.

SIP Network Topology

SIP network topology is the application-layer layout of the interconnections and routing information among linked SIP entities. It includes two parts: one is interconnections among all SIP entities, the other is how SIP-domains are connected to each other. For example, the SIP network topology in FIG. 1 includes: link 121 between proxy 102 and UA 103, link 122 between proxy 112 and UA 113, link 120 between proxy 102 and proxy 112, and SIP-domain 101 and 111 are connected by proxy 102 and proxy 112 through link 120.

Topology Agent

A topology agent is a UA associated with a specific SIP-domain. It is created by management system and registers with the governor proxy in the specific SIP-domain. The main job of topology agent is to generate and collect topology-exploring messages. These messages are used to gather routing information for management system to deduce network topology.

Topology-exploring Message

A topology-exploring message is a standard SIP request of OPTIONS method. OPTIONS method allows a UA to query the capabilities of another UA or a proxy without disturbing the other party, for example, the media encoding format it supports.

Table 1 is an example of topology-exploring message sent by a topology agent.

TABLE 1

Topology-exploring Message Example 1

OPTIONS sip:topology_agent_002@b.example.com SIP/2.0
Via: SIP/2.0/UDP
station.example.com;branch=z9hG4bKhjhs8ass877;received=192.0.2.1
Max-Forwards: 70
To: <sip:topology_agent_002@b.example.com>
From: topology_agent_001
<sip:topology_agent_001@a.example.com>;tag=1928301774
Call-ID: a84b4c76e66710
CSeq: 63104 OPTIONS
Contact: <sip:admin@station.example.com >
Accept: application/sdp
Content-Length: 0

In this topology-exploring message the information of original agent (OA) sending this message (FROM header field) and the information of destination agent (DA) to which the message will arrive (TO header field) are included.

Table 2 is an example of topology-exploring message received by a topology agent.

TABLE 2

Topology-exploring Message Example 2

OPTIONS sip:topology_agent_002@b.example.com SIP/2.0
Via: SIP/2.0/UDP proxy_b.b.exapmle.com;branch=z9hG4bKnashds8;received=192.0.2.3
Via: SIP/2.0/UDP proxy_a.a.example.com;branch=z9hG4bK77ef4c2312983.1;received=192.0.2.2
Via: SIP/2.0/UDP station.example.com;branch=z9hG4bKhjhs8ass877;received=192.0.2.1
Max-Forwards: 70
To: <sip:topology_agent_002@b.example.com>
From: topology agent_001 <sip:topology_agent_001@a.example.com>;tag=1928301774
Call-ID: a84b4c76e66710
CSeq: 63104 OPTIONS
Contact: <sip:admin@station.example.com >
Accept: application/sdp
Content-Length: 0

When a topology agent receives a topology-exploring message, it can retrieve routing information including Original Agent (OA) from FROM header field, Destination Agent (DA) from TO header field, and the Path information (P) from VIA header fields. The path information in the topology-exploring message is added automatically by each SIP node passed by the message and extracted by the receiving topology agent.

Table 3 illustrates the routing information retrieved from Table 2 example.

TABLE 3

Routing Information Example

Figure 2A:
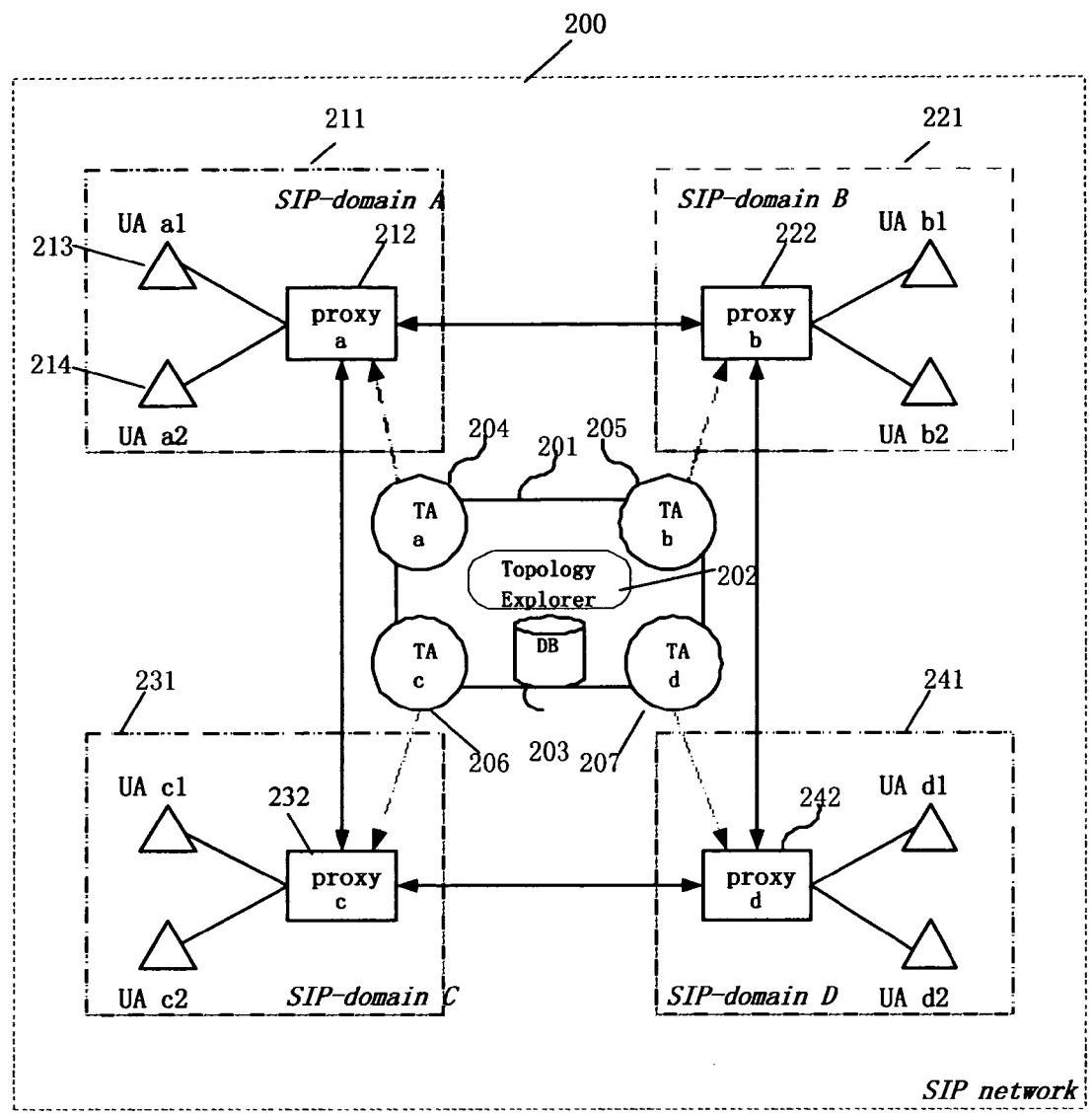
FIG. 2a is a diagram illustrating the SIP network topology discovery architecture according to the present invention.
Figure 2B:
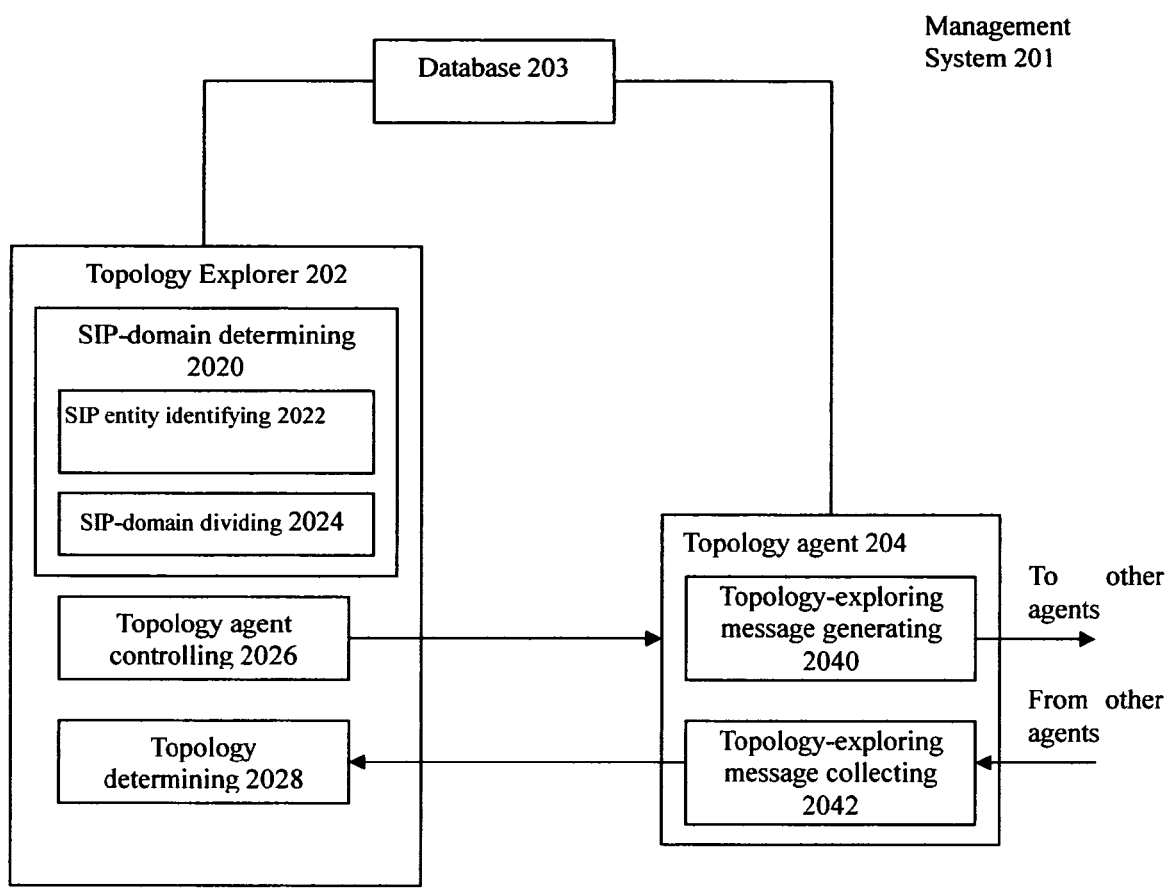
FIG. 2b is a detailed block diagram illustrating the SIP network topology discovery system according to the present invention.

OA:topology_agent_001@a.examplecom
DA:topology_agent_002@b.examplecom
P: proxy_aa.examplecom; proxy_bb.examplecom;

First, the system architecture of the SIP network topology discovery system according to the present invention is described in detail in reference with FIGS. 2a and 2b.

FIG. 2a is a diagram illustrating the SIP network topology discovery architecture according to the present invention. Four SIP-domains 211, 221, 231 and 241 are illustrated in the whole SIP network. Each SIP-domain includes a proxy and a plurality of user agents. Each UA is registered with the proxy in the SIP-domain it locates. The management system 201 consists of three parts, topology explorer 202, topology agents 204-207, and database 203. Each of topology agents 204-207 corresponds to SIP-domains 211, 221, 231 and 241 respectively and is registered with the proxy in that SIP-domain.

FIG. 2b is a detailed block diagram illustrating the SIP network topology discovery system according to the present invention. For briefness, only one topology agent 204 is illustrated in FIG. 2b. It should be understood that the number of topology agents in the management system of the present invention is same with the number of SIP-domains in SIP network. And other topology agents have the same structures and functions with topology agent 204.

In FIG. 2b, topology explorer 202 further includes: SIP-domain determining means 2020, topology agent controlling means 2026 and topology determining means 2028. SIP-domain determining means 2020 is used to determine a plurality of SIP-domains in the SIP network, in which each SIP-domain contains a govern proxy and one or more user agents. Topology agent controlling means 2026 is used to assign a topology agent for each SIP-domain and registering it to each specific SIP-domain. Topology determining means 2028 is used to determine the topology of the SIP network according to routing information collected by each topology agent.

SIP domain determining means 2020 further includes SIP entity identifying means 2022 and SIP-domain dividing means 2024. SIP entity identifying means 2022 identifies each SIP entity in the SIP network, determines whether the SIP entity is a proxy or a user agent. SIP-domain dividing means 2024 divides the identified proxy and user agents into the SIP-domains, forming a plurality of SIP-domains in the SIP network.

Topology agent 204 further includes topology exploring message generating means 2040 and topology exploring message collecting means 2042. Topology exploring message means 2040 generates the topology exploring messages to all of the other topology agents to explore the paths. Topology exploring message collecting means 2042 collects the topology exploring messages from all of the other topology agents, retrieves routing information based on the collected topology exploring messages and provides the routing information to the topology determining means 2028 in the topology explorer 202.

Database 203 is used to store related records for topology discovery.

It can be understood by those skilled in the art that although the topology explorer is described above as including SIP entity identifying means, SIP-domain determining means, topology agent controlling means and topology determining means etc., and the topology agent is described as including topology exploring message generating means and topology exploring message collecting means, the above means are not limited to be implemented by hardware. In fact, those means mentioned in the present invention can be implemented by both software and hardware.

Overall Workflow

Figure 3:
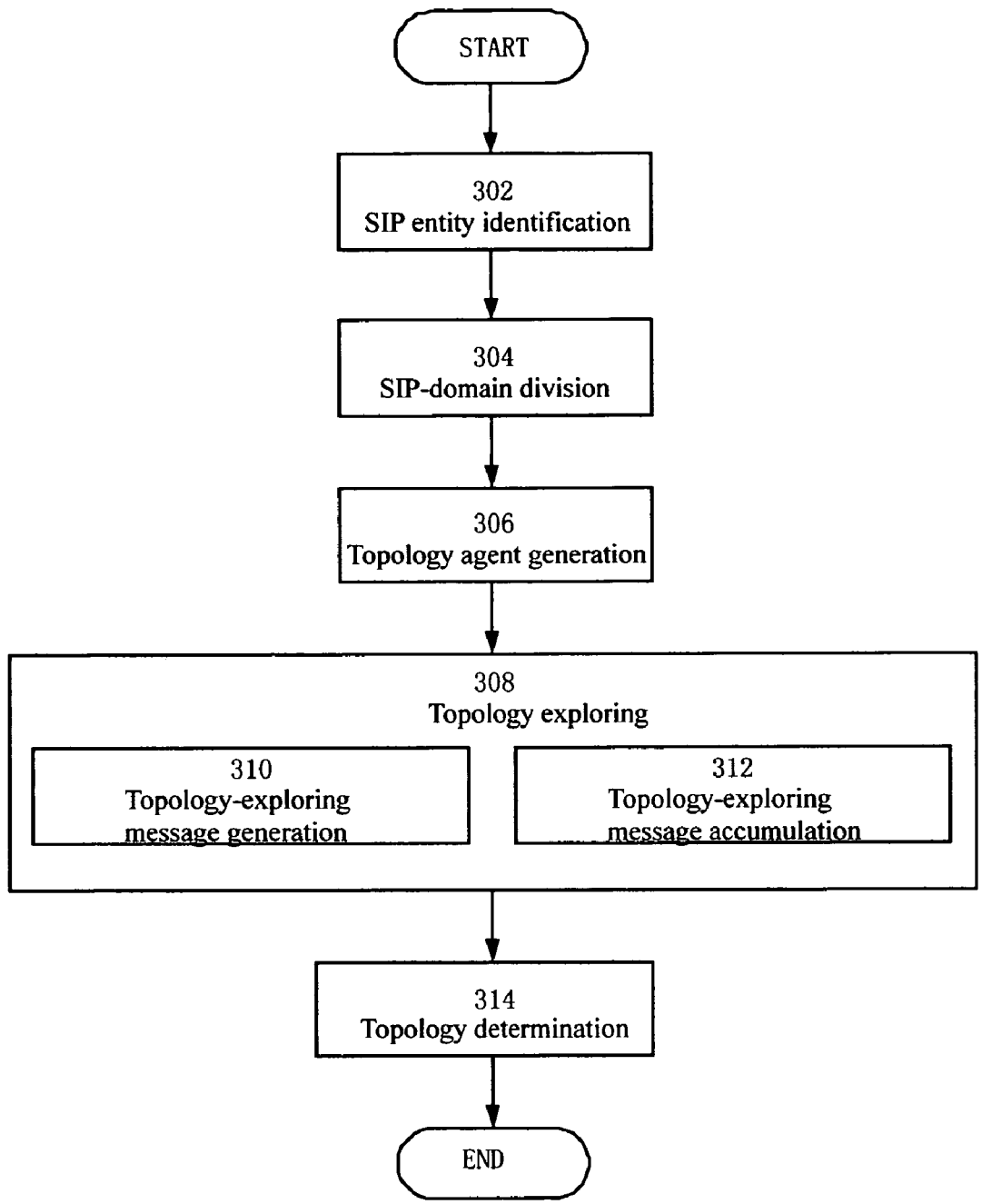
FIG. 3 is a flow chart illustrating the SIP network topology discovery method according to the present invention.

FIG. 3 is a flow chart illustrating the SIP network topology discovery method according to the present invention. The presented method consists of five phases: SIP entities identification 302, SIP-domains division 304, topology agents generation 306, topology exploring 308, and topology determination 314. Topology exploring phase 308 includes two parts, topology-exploring messages generation part 310 and topology-exploring messages accumulation part 312. During SIP entities identification phase 302, all SIP-enabled entities in the SIP network are identified and recorded. During SIP-domains division phase 304, SIP network is divided into a group of SIP-domains and all SIP entities are assigned to corresponding SIP-domains. During topology agent generation phase 306, topology agents are created for each SIP-domain and registered with governor proxy of each SIP-domain. During topology exploring phase 308, each topology agent generates topology-exploring messages and collects topology-exploring messages from all other topology agents to gather routing information. During topology determination phase 314, the SIP network topology is assembled based on the routing information gathered by topology agents.

Now we describe all these five phases in detail with reference to the exemplary SIP network 200 shown in FIG. 2a.

SIP Entities Identification

In this phase, all SIP-enabled entities in the SIP network are identified and recorded. Topology explorer, for example 202 in FIG. 2a, performs the operation of identification and recording.

Figure 4:
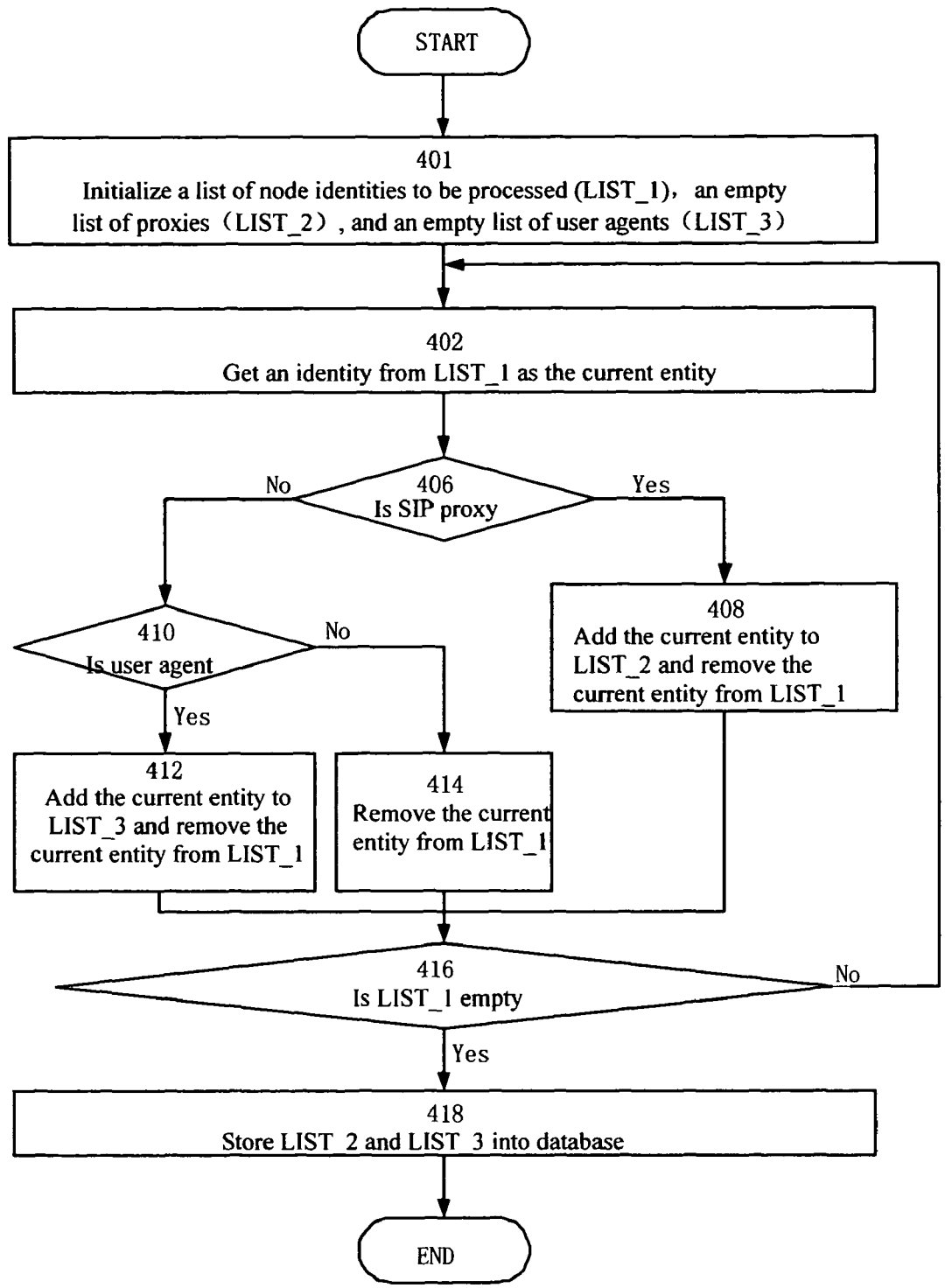
FIG. 4 is a flow chart illustrating the SIP entity identification phase according to the present invention.

FIG. 4 is a flow chart illustrating the SIP entity identification phase according to the present invention.

Referring to FIG. 4, three lists are initialized at step 401. The first list (LIST_1) includes the identities of network nodes to be processed. They could be the identities of nodes that have been discovered by other network management systems or some identities inputted manually. The second list (LIST_2) includes the identities of SIP proxies that have been discovered. The third list (LIST_3) includes the identities of user agents that have been discovered. Initially, LIST_2 and LIST_3 are empty.

At step 402, an identity is selected from LIST_1 as the current entity to be processed. For example, SIP entity 212 or 213 is selected from LIST_1.

At step 406, the current entity is identified to see if it is a SIP proxy or not. To achieve this, topology explorer could send a standard SIP REGISTER request to current entity to perform a registration try. If the registration try successfully completes, the current entity is identified as a SIP proxy. Otherwise, it is not a proxy. If the current entity is a SIP proxy, the topology explorer goes to step 408 to add the current entity into LIST_2 and remove it from LIST_1. In the present example, SIP entity 212 is identified as a SIP proxy and added into LIST_2.

At step 406, if it is determined that the current entity is not a SIP proxy, then the process proceeds to step 410. At step 410, the current entity is identified to see if it is a user agent or not. To achieve this, topology explorer could send a standard SIP OPTION request to current entity to perform a SIP ping. If the ping successfully completes, the current entity is identified as a user agent. Otherwise, it is not a user agent. If the current entity is a user agent, then the process goes to step 412 to add the current entity into LIST_3 and remove it from LIST_1. If the current entity is not a user agent, then the process goes to step 414 to remove it from LIST_1. In the present embodiment, SIP entity 213 is identified as a user agent and added into LIST_3.

At step 416, it is determined whether LIST_1 is empty. If LIST_1 is not empty, steps 402-416 are repeated for each identity in the LIST_1 to identify all SIP entities. Otherwise, the proxy list LIST_2 and user agent list LIST_3 are stored into database at step 418. Then, the SIP entities identification phase is done.

SIP-Domain Determination

Figure 5:
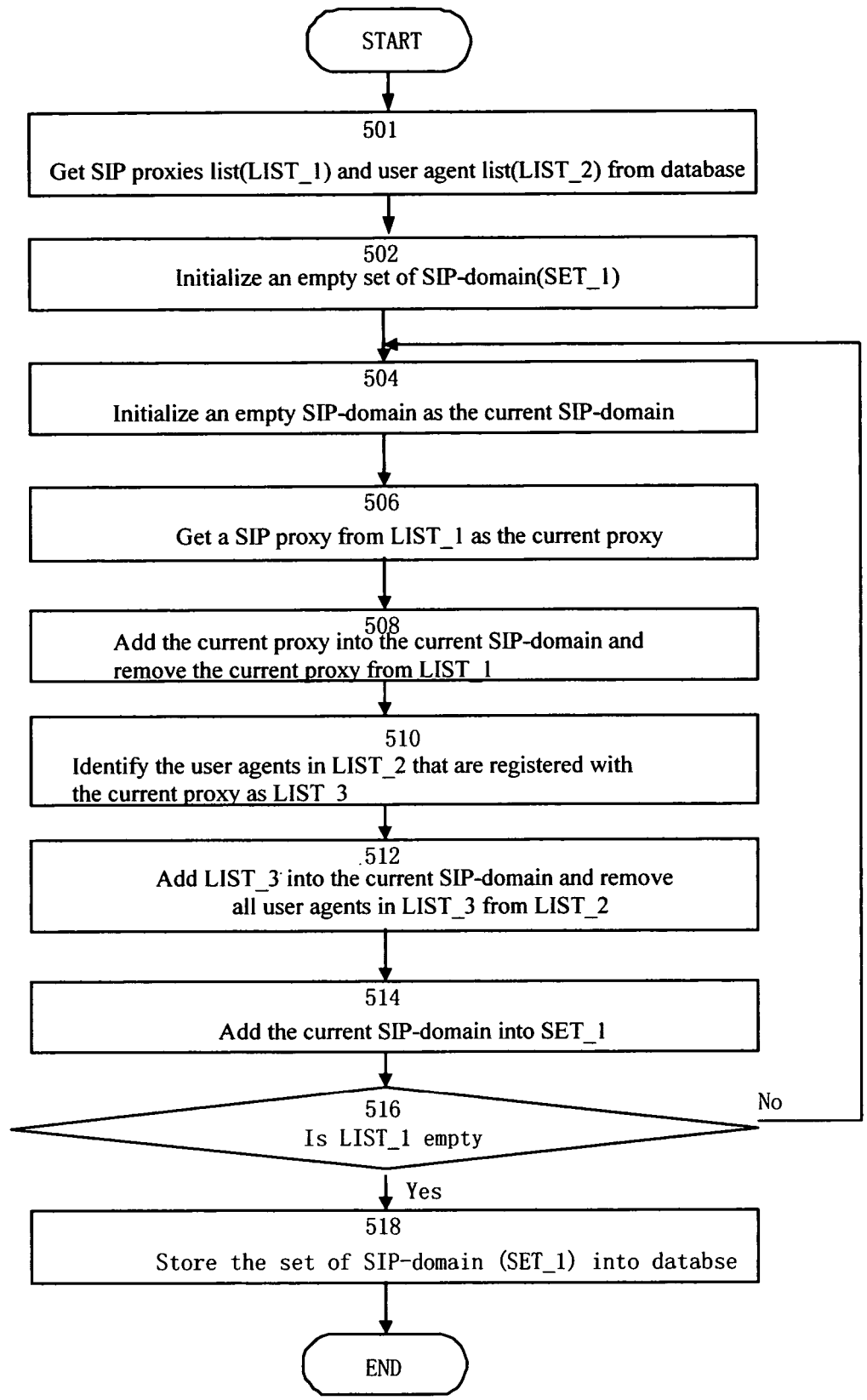
FIG. 5 is a flow chart illustrating the SIP-domain division phase according to the present invention.

In this phase, SIP network is divided into a group of SIP-domains and all SIP entities are assigned to corresponding SIP-domains. Topology explorer, for example 202 in FIG. 2a, performs these operations. FIG. 5 is a flow chart illustrating the SIP-domain division phase according to the present invention.

Referring to FIG. 5, proxy list (LIST_1) and user agent list (LIST_2) discovered in last phase are retrieved from database at step 501.

At step 502, an empty set of SIP-domain (SET_1) is initialized to store processed SIP-domains.

At step 504, an empty SIP-domain is initialized as the current SIP-domain. In the exemplary SIP network, it shall be assumed that SIP-domain 211 is initialized as the current SIP-domain.

At step 506, a SIP proxy is selected from LIST_1 as the current proxy. In the present embodiment, proxy 212 shall be the current proxy.

At step 508, the current proxy is added into the current SIP-domain as the governor proxy and removed form LIST_1. In the present embodiment, proxy 212 is added into the SIP-domain 211 and removed from LIST_1.

At step 510, all user agents registered with the current proxy in LIST_2 are retrieved to compose the LIST_3. The registration information of the current proxy could be retrieved by standard SNMP protocol from Management Information Base (MIB) of proxy or by program based on Command Line Interface (CLI). In the present embodiment, user agents 213 and 214 are the user agents registered with the current proxy 212 and retrieved to compose the LIST_3.

At step 512, user agents in LIST_3 are added into the current SIP-domain and removed from LIST_2. Then, the current SIP-domain is added into SET_1 at step 514. In the present embodiment, SIP-domain 211 including 212,213 and 214 is added into SET_1.

At step 516, it is determined whether LIST_1 is empty. If LIST_1 is not empty, steps 404-416 are repeated until LIST_1 is empty to determine all SIP-domains. Otherwise, SIP-domains set SET_1 is stored into database at step 518. Then, the SIP-domain determination phase is done.

In fact, above SIP entity identification and SIP-domain division phase are not the only way to determine the SIP-domain. We can also determine SIP-domain by other ways. For example, we can obtain the SIP entities in each SIP-domain directly by obtaining the existing information about SIP-domain division.

Topology Agent Generation

Figure 6:
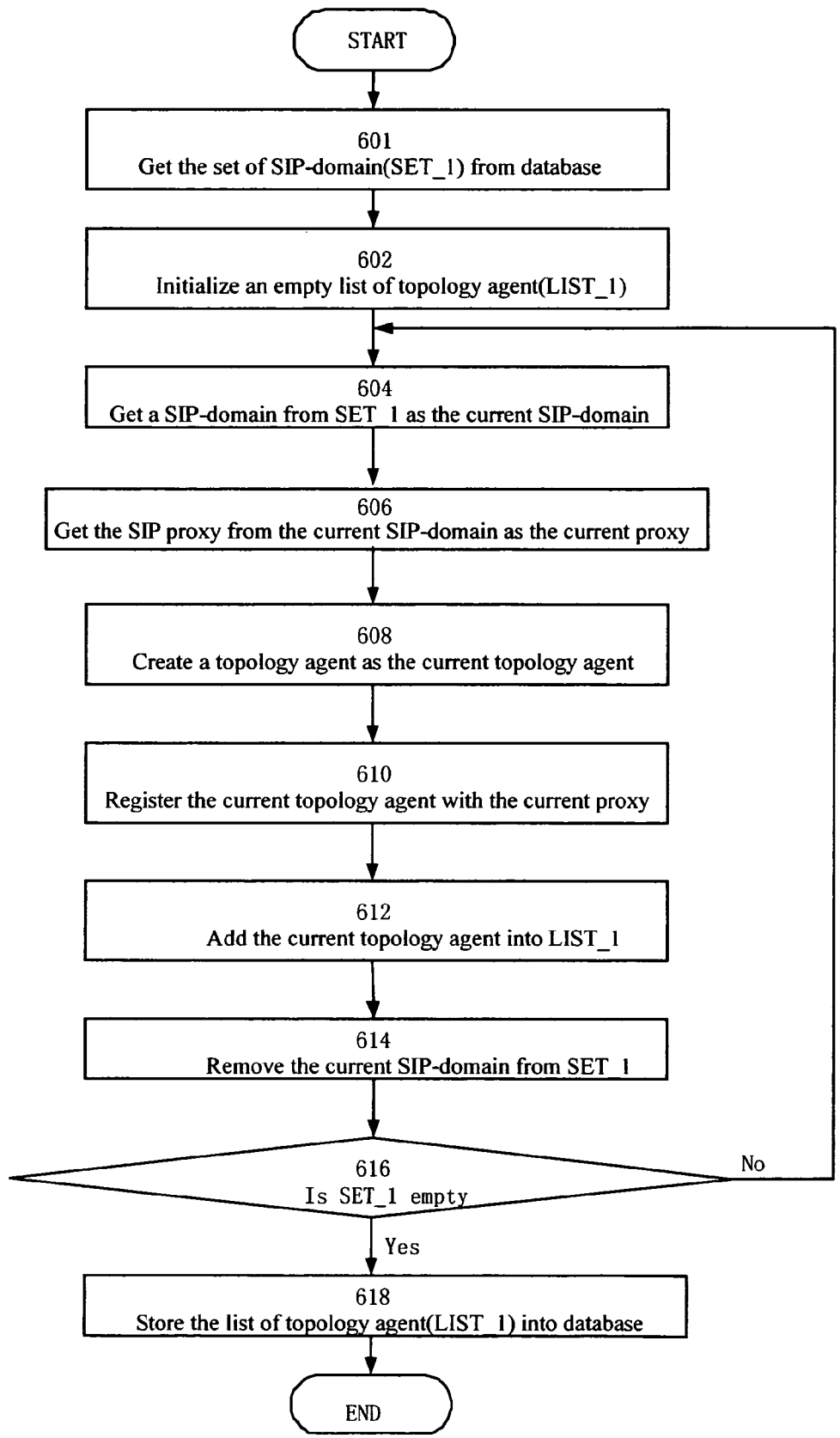
FIG. 6 is a flow chart illustrating the topology agent generation phase according to the present invention.

In this phase, topology agents are created for each SIP-domain and registered with governor proxy in each SIP-domain. Topology explorer, for example 202 in FIG. 2a, performs these operations. FIG. 6 is a flow chart illustrating the topology agent generation phase according to the present invention.

Referring to FIG. 6, SIP-domains set (SET_1) determined in last phase is retrieved from database at step 601.

At step 602, an empty list of topology agent LIST_1 is initialized to store the created topology agents in the following steps.

At step 604, a SIP-domain is selected from SET_1 as the current SIP-domain. In the present embodiment, SIP-domain 211 should be the current SIP-domain.

At step 606, the governor proxy is selected from the current SIP-domain as the current proxy. In the present embodiment, proxy 212 should be the current proxy.

At step 608, a topology agent is created as the current topology agent. In the present embodiment, topology agent 204 is created.

Then, at step 610, the current topology agent is registered with the current proxy. The current topology agent sends a standard SIP REGISTER request to the current proxy for registration. In the present embodiment, topology agent 204 registers with proxy 212.

At step 612, the current topology agent is added into LIST_1. In the present embodiment, topology agent 204 is added into LIST_1.

At step 614, the current SIP-domain is removed from SET_1. In the present embodiment, SIP-domain 211 is removed from SET_1.

At step 616, it is determined whether SET_1 is empty. If SET_1 is not empty, steps 604-616 are repeated until SET_1 is empty to create and register topology agents for all SIP-domains. Otherwise, topology agents list LIST_1 is stored into database at step 618. Then, the topology agent generation phase is done.

Topology Exploring

In this phase, each topology agent generates topology-exploring messages to send to all other topology agents, and collects topology-exploring messages from all other topology agents to gather routing information. Topology exploring phase includes two parts, topology-exploring message generation and topology-exploring message accumulation. These two parts are performed by each topology agent to complete this phase.

Topology-Exploring Message Generation

Figure 7:
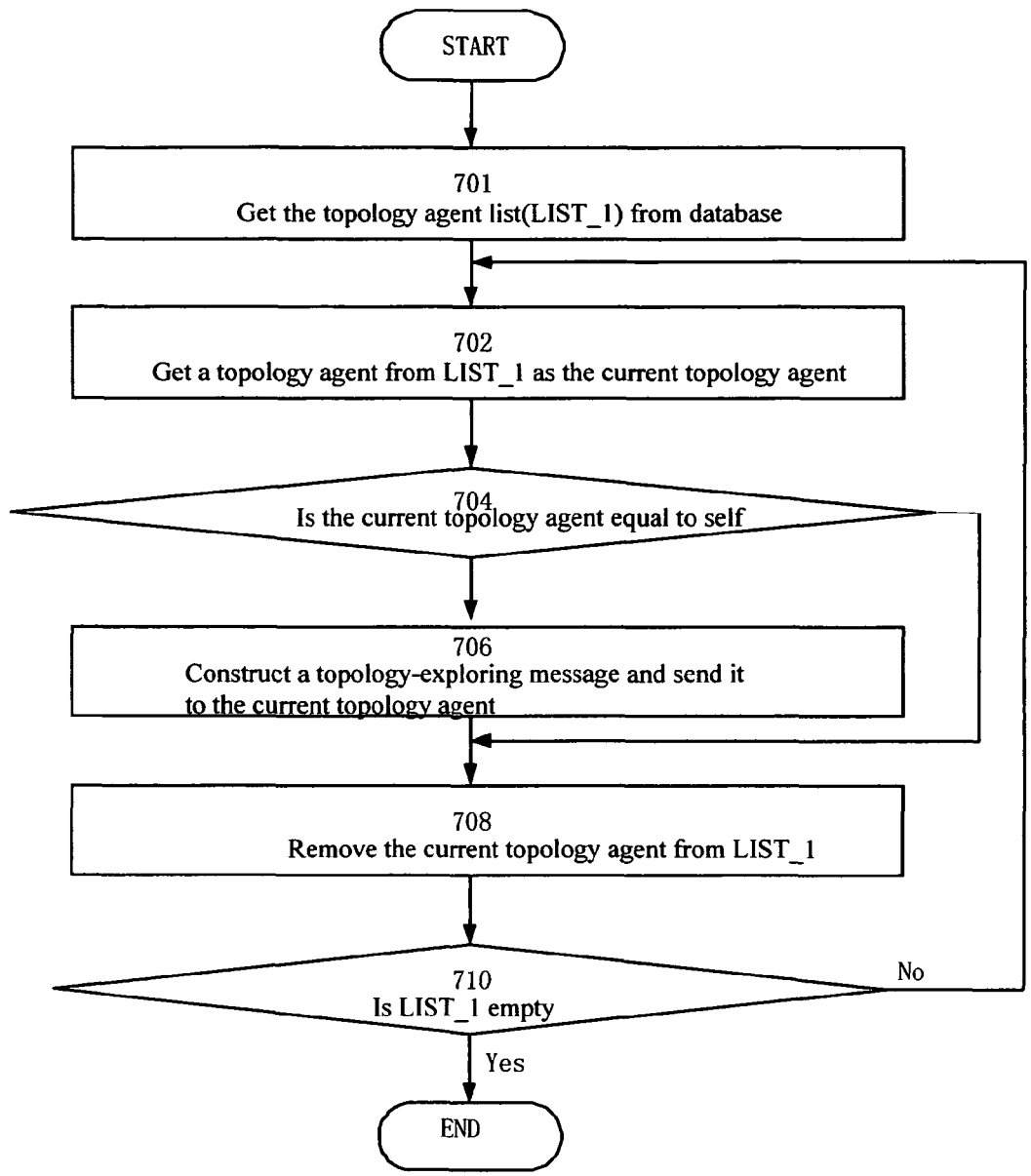
FIG. 7 is a flow chart illustrating the topology-exploring message generation phase according to the present invention.

In this part, a topology agent generates topology-exploring messages to all other topology agents to explore paths in the SIP network. FIG. 7 is the flow chart that illustrates steps in this part.

Referring to FIG. 7, at step 701, a topology agent gets the topology agent list from database as LIST_1 to generate topology-exploring messages to all other topology agents. For example, the topology agent 204 performing topology-exploring message generation gets topology agents list 204-207 as LIST_1.

At step 702, a topology agent is selected from LIST_1 as the current topology agent.

At step 704, it is determined whether the current topology agent is equal to the topology agent performing topology-exploring message generation itself. If it is true, the process goes to step 708 to avoid self-loop.

Otherwise, at step 706, the topology agent performing topology-exploring message generation constructs a topology-exploring message and sends it to the current topology agent. In the present embodiment, if the current topology agent is 204, the topology agent 204 goes to step 708. If the current topology agent is 205, the topology agent 204 constructs a topology-exploring message and sends it to topology agent 205.

At step 708, the current topology agent is removed from LIST_1.

At step 710, it is determined whether LIST_1 is empty. If LIST_1 is not empty, steps 702-710 are repeated until LIST_1 is empty to generate and send topology-exploring messages to all other topology agents. Otherwise, the topology-exploring messages generation part of this topology agent is done.

All above steps are repeated for each topology agent until each topology agent has generated and sent topology-exploring messages to all other topology agents.

Topology-Exploring Messages Accumulation

Figure 8:
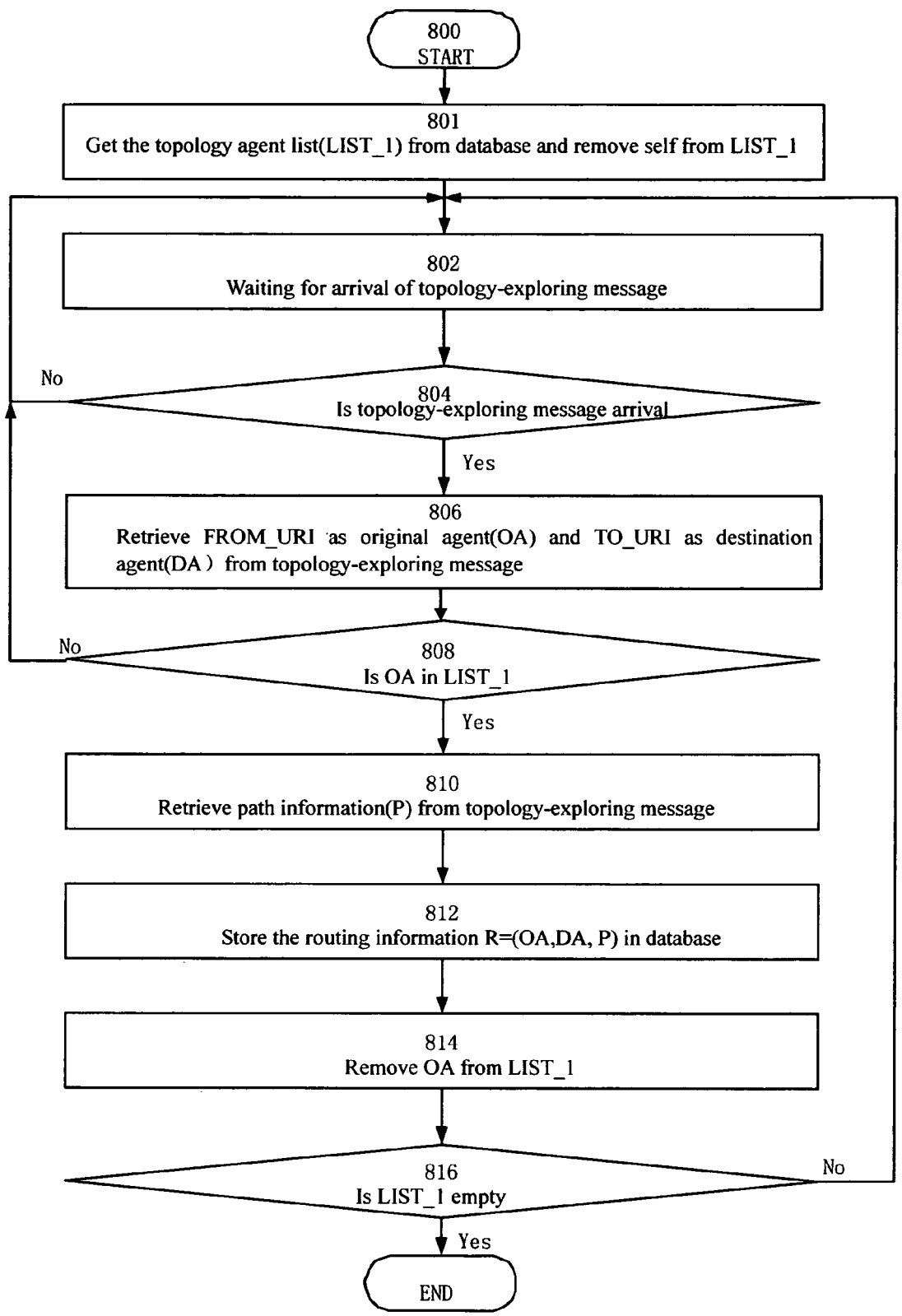
FIG. 8 is a flow chart illustrating the topology-exploring message accumulation phase according to the present invention.

In this part, a topology agent collects topology-exploring messages from all other topology agents to gather routing information of the SIP network. FIG. 8 is the flow chart that illustrates steps in this part.

Referring to FIG. 8, at step 801, a topology agent gets the topology agent list from database as LIST_1 and removes itself from LIST_1. For example, the topology agent 204 gets topology agents list 204-207 as LIST_1 and removes 204 from LIST_1.

Then, the topology agent gets ready to receive topology-exploring messages from other agents at step 802.

At step 804, it is determined whether a topology-exploring message arrives. If no topology-exploring message arrives, the topology agent goes back to step 802 for waiting. Otherwise, the topology agent will proceed to step 806 to process the received topology-exploring message. For example, the topology agent 204 receives a topology-exploring message from the topology agent 207.

At step 806, the topology agent retrieves the FROM_URI as the original agent (OA) and the TO_URI as the destination agent (DA) from the received topology-exploring message. In the present embodiment, the topology agent 204 gets the SIP URI of the topology agent 207 as the OA and the SIP URI of the topology agent 204 as the DA.

At step 808, it is determined whether the OA is in LIST_1. If the OA is not in LIST_1, which means the received topology-exploring message is a duplicate one, the topology agent goes back to step 802 to wait for another message. Otherwise, the topology agent goes to step 810 to retrieve path information (P) from the received topology-exploring message. In the present embodiment, OA 207 is in LIST_1. The path information P retrieved from the topology-exploring message is "242;222;212".

At step 812, the routing information composed by OA, DA, and P is stored into database. In the present embodiment, R is (207, 204, "242;222;212") that is stored into database.

At step 814, the OA is removed from LIST_1. In the present embodiment, agent 207 is removed from LIST_1. At step 816, it is determined whether LIST_1 is empty. If LIST_1 is not empty, steps 802-816 are repeated until LIST_1 is empty to collect topology-exploring messages from all other topology agents. Otherwise, the topology-exploring messages accumulation part of this topology agent is done.

All above steps are repeated for each topology agent until each topology agent has collected topology exploring messages from all other topology agents.

Topology Determination

Figure 9:
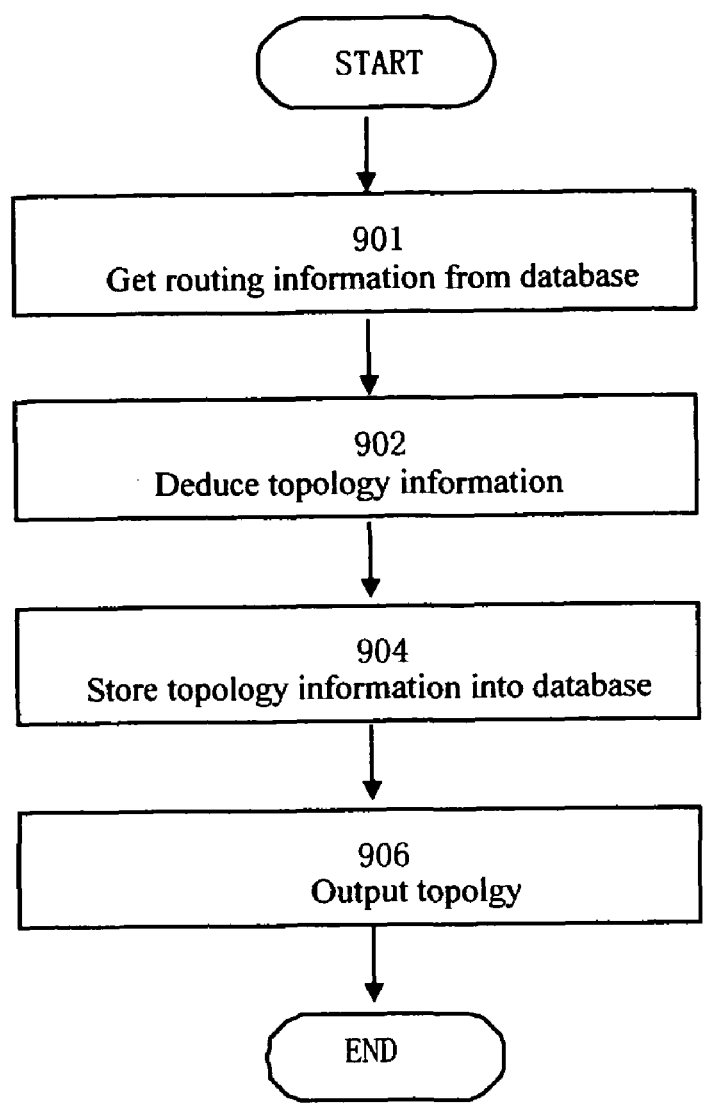
FIG. 9 is a flow chart illustrating the topology determination phase according to the present invention.

In this phase, the SIP network topology is assembled based on the routing information gathered by topology agents. Topology explorer, for example 202 in FIG. 2a, performs the determination. FIG. 9 is the flow chart that illustrates steps in this phase.

Figure 10:
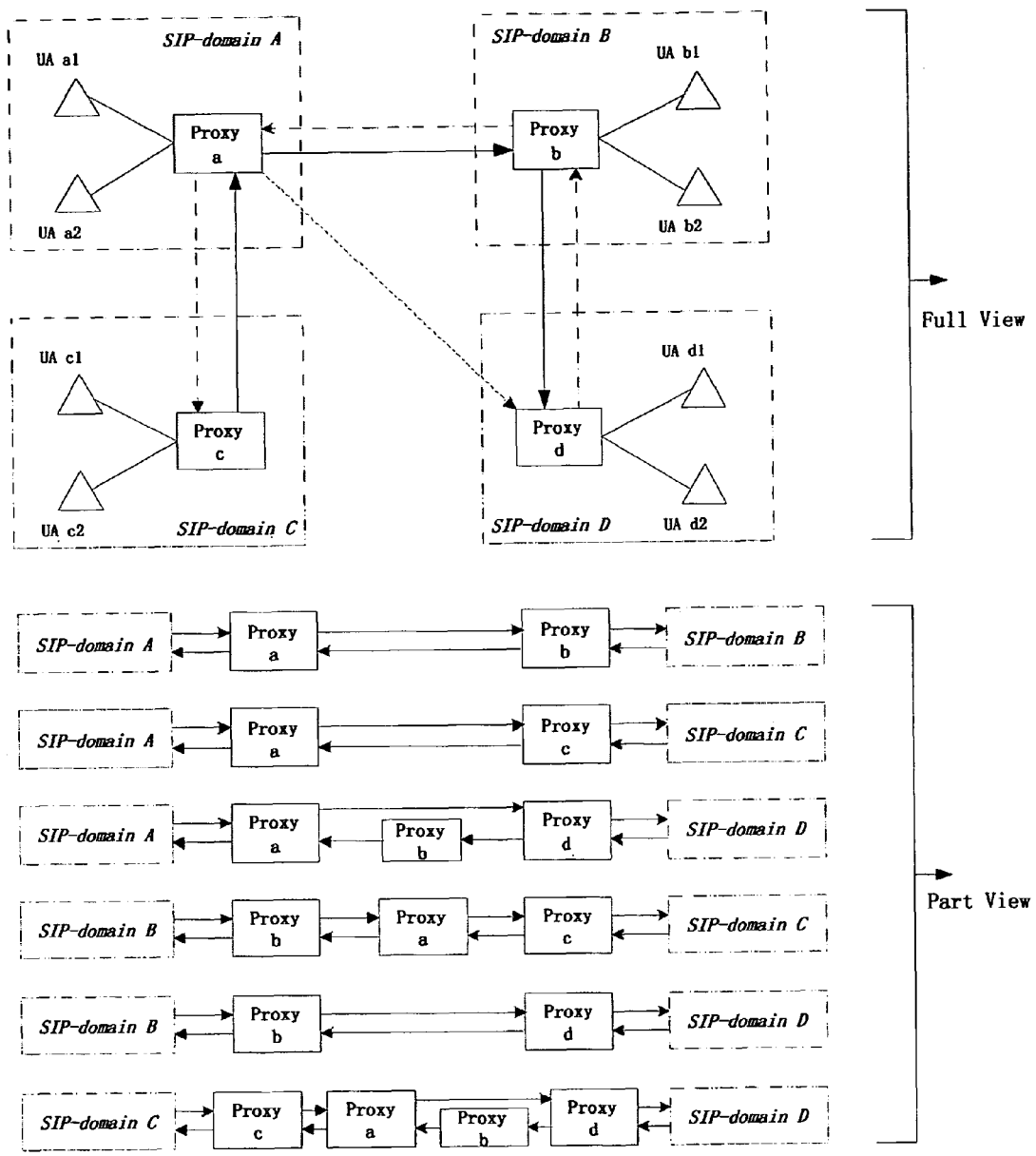
FIG. 10 is a diagram illustrating an example of SIP network topology according to the present invention.

Referring to FIG. 9, at step 901, all routing information gathered by topology agents is retrieved from database. At step 902, the topology explorer deduces the topology of the SIP network based on the above routing information. How to deduce the topology of the network based on the routing information is known in the art and will not be described in detail here. At step 904, the topology information is stored into database. At step 906, the topology of the SIP network is outputted and the topology determination phase is done. In the present embodiment, the discovered topology is shown in FIG. 10. It can be seen from FIG. 10 that, the topology generated after the topology determination phase can represent the SIP entities in SIP-domain of SIP network, the interconnect relationship between the SIP entities and the interconnect relationship between the SIP-domains.

Methods and systems have been disclosed for topology discovery in a SIP network. Software written to implement the present invention is to be stored in some form of computer-readable medium, such as memory, CD-ROM or transmitted over a network, and executed by a processor. Alternatively, some or all of the present invention could be implemented in hardware.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The invention claimed is:

1. A method for topology discovery in a SIP network, the SIP network including a plurality of SIP entities, the method comprising the steps of:
   determining a plurality of SIP-domains in the SIP network, each SIP-domain including a governor proxy and at least one user agent;
   generating a topology agent for each SIP-domain and registering the topology agent with the governor proxy of each SIP-domain;
   generating and collecting topology-exploring messages by the topology agent to gather routing information of the SIP network based on the collected topology-exploring messages, wherein the routing information is gathered based on information automatically added to one or more given topology-exploring messages as the one or more given topology-exploring messages traverse the SIP network; and
   determining topology of the SIP network based on the routing information.

2. The method of claim 1, wherein the step of determining a plurality of SIP-domain in the SIP network comprises the steps of:
   identifying each SIP entities in the SIP network to obtain a proxy list containing all of the governor proxies in the SIP network and a user agent list containing all of the user agents in the SIP network;
   determining SIP entities belonging to the respective SIP-domain, thereby forming a plurality of SIP-domains in the SIP network.

3. The method of claim 2, wherein the step of identifying each SIP entities in the SIP network comprises the steps of:
   sending a standard SIP REGISTER request to the SIP entity to perform a registration try, if the registration try succeeds, identifying the SIP entity as a governor proxy.

4. The method of claim 3, wherein the step of identifying each SIP entities in the SIP network comprises the steps of:
   if the registration try does not succeed, sending a standard SIP OPTION request to the SIP entity to perform a SIP ping, if the SIP ping succeeds, identifying the SIP entity as a user agent.

5. The method of claim 2, wherein the step of determining SIP entities belonging to the respective SIP-domain, thereby forming a plurality of SIP-domains in the SIP network comprises the steps of:
   a) selecting a proxy from the proxy list as the current proxy;
   b) retrieving all user agents that are registered with the current proxy;
   c) adding the current proxy and all of the user agents registered with the current proxy into a SIP-domain; and
   d) repeating steps a) through c) until all proxies in the proxy list and corresponding user agents have been processed to partition the SIP network into a plurality of SIP-domains.

6. The method of claim 1, wherein the step of generating a topology agent for each SIP-domain and registering the topology agent with the governor proxy of each SIP-domain comprises the steps of:
   a) selecting a SIP-domains in the SIP network as the current SIP-domain;
   b) creating a topology agent for the current SIP-domain;
   c) registering the topology agent with the governor proxy of the SIP-domain;
   d) repeating steps a) through c) until each SIP-domain within the SIP network has a corresponding topology agent that registered with the governor proxy.

7. The method of claim 1, wherein the step of generating and collecting topology-exploring messages by the topology agent comprises the steps of:
   generating topology-exploring messages by each topology agent and send the topology-exploring messages to all other topology agents; and
   collecting topology-exploring messages from all other topology agents by each topology agent.

8. The method of claim 7, wherein the step of collecting topology-exploring messages from all other topology agents by each topology agent comprises the steps of:
   retrieving the original agent, destination agent and path information from the received topology-exploring message by each topology agent to compose routing information.

9. A system for discovering topology in a SIP network, the SIP network including a plurality of SIP entities, the system comprising:
   SIP-domain determining means for determining a plurality of SIP-domains in the SIP network, each SIP-domain including a governor proxy and at least one user agent;
   topology agent controlling means for assigning a topology agent for each SIP-domain and registering the topology agent to each specific SIP-domain;
   topology agents corresponding to each SIP-domain and registered with the governor agent of each SIP-domain, for generating and collecting topology-exploring messages to gather routing information of the SIP network based on the collected topology-exploring messages, wherein the routing information is gathered based on information automatically added to one or more given topology-exploring messages as the one or more given topology-exploring messages traverse the SIP network; and
   topology determining means for determining topology of the SIP network based on the routing information.

10. The system of claim 9, wherein the SIP-domain determining means comprises:
    SIP entity identifying means for identifying each SIP entities in the SIP network to obtain a proxy list containing all of the governor proxies in the SIP network and a user agent list containing all of the user agents in the SIP network; and
    SIP-domain dividing means for determining SIP entities belonging to the respective SIP-domain, thereby forming a plurality of SIP-domains in the SIP network.

11. The system of claim 10, wherein the SIP entity identifying means sends a standard SIP REGISTER request to the SIP entity to perform a registration try and, if the registration try succeeds, identifies the SIP entity as a governor proxy.

12. The system of claim 11, wherein the SIP entity identifying means is further configured as:
    if the registration try does not succeed, the SIP entity identifying means sends a standard SIP OPTION request to the SIP entity to perform a SIP ping and, if the SIP ping succeeds, identifies the SIP entity as a user agent.

13. The system of claim 10, wherein the SIP-domain dividing means retrieves all user agents that are registered with a governor proxy in the proxy list and adds the governor proxy and all of the user agents registered with the governor proxy into a SIP-domain.

14. The system of claim 9, wherein the topology agent further includes:
    topology-exploring message generating means for generating topology-exploring messages and sending the topology-exploring messages to all other topology agents; and topology-exploring message collecting means for collecting topology-exploring messages from all other topology agents.

15. The system of claim 9, wherein each topology agent retrieves the original agent, destination agent and path information from the received topology-exploring message to compose routing information.

16. The system of claim 9, further including a database for storing topology related information.

17. A non-transitory computer readable storage medium embodying computer executable program code, the program code being used to implement the method of topology discovery in an SIP network, the SIP network including a plurality of SIP entities, the method comprising the steps of:

determining a plurality of SIP-domains in the SIP network, each SIP-domain including a governor proxy and at least one user agent;

generating a topology agent for each SIP-domain and registering the topology agent with the governor proxy of each SIP-domain;

generating and collecting topology-exploring messages by the topology agent to gather routing information of the SIP network based on the collected topology-exploring messages, wherein the routing information is gathered based on information automatically added to one or more given topology-exploring messages as the one or more given topology-exploring messages traverse the SIP network; and determining topology of the SIP network based on the routing information.

* * * * *